(12) United States Patent
Machiraju (10) Patent No.: US 7,787,368 B1
(45) Date of Patent: Aug. 31, 2010

(54) IN-NETWORK PER PACKET CASHES (75) Inventor: Sridhar Machiraju, Burlingame, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 232 days.

(21) Appl. No.: 12/038,842

(22) Filed: Feb. 28, 2008

(51) Int. Cl.
*H04L 12/26* (2006.01)

(52) U.S. Cl. ........................................ 370/229; 370/390

(58) Field of Classification Search ................. 370/229, 370/235, 390
See application file for complete search history.

(56) References Cited

U.S. PATENT DOCUMENTS

2008/0028468 A1* 1/2008 Yi et al. ........................ 726/23
2008/0224902 A1* 9/2008 Samuels et al. ............... 341/51

OTHER PUBLICATIONS

Neil T. Spring et al., 'A Protocol-Independent Technique for Eliminating Redundant Network Traffic', 2000 ACM, SIGCOMM '00, pp. 87-95.*

Machiraju, Sridhar "Optimizing Wireless Networks by Free-Riding on Users".

* cited by examiner

*Primary Examiner*—Melvin Marcelo (57) ABSTRACT

Methods, systems, and media are provided for the improved efficiency in bandwidth usage for transmitting repeated packets in a manner that is transparent to users. Fast, in-network per-packet caches (INPPC) at each node of a transmission retain packets for a configurable period of time or a number of packets. Rather than retransmit data from a first node to a second node within the time period for retention, an identifier is sent. The identifier allows the receiving node to access the first packet still in cache memory and reduces the size of the transmission, thereby optimizing bandwidth usage. Signatures that allow for efficient determination of packet redundancy, such as hashes, can be used. Accordingly, less bandwidth is utilized for repeated transmissions, such as transmission control protocol (TCP) retransmissions, or users accessing the same content within close proximity both physically and temporally.

19 Claims, 4 Drawing Sheets

IN-NETWORK PER PACKET CASHES

BACKGROUND

As the number of networks and traffic on networks increase, bandwidth becomes a scarce and valuable resource. The expanding quantity of wireless access points, as an example, creates a need for optimized bandwidth usage. The monetary expense required to establish wired access or the reliability of wireless access points are just two examples of ways in which bandwidth reduction materially affects network topology and performance. A number of methods for compression have been introduced that provide savings to a user by reducing the amount of bandwidth required for a transmission. However, while many compression schemes allow for the exploitation of redundancies within a single transmission, they do not leverage the potential bandwidth savings available in exact packet duplication within or across different transmissions. Particularly when providing bandwidth for large numbers of transmissions, exploitation of this form of repetition can present a substantial savings in usage and improve the quality of the end-user experience.

SUMMARY

The present invention is defined by the claims below. Embodiments of the present invention solve at least the above problems by providing systems, computer-storage media and methods for, among other things, exploiting repeated packet transmissions across one or more packet streams. Fast, in-network per-packet caches (INPPC) allow for the retention of packets for a specified timeframe. Recently transmitted packets then can be accessed by reference to the cached packet, rather than retransmitting the entire packet. This can take place on a per-link basis, or across several hops of a network. The present invention has several practical applications in the technical arts including reducing the bandwidth needed for packet backhaul, reducing the need for installation of wired access and improving performance of wireless access points. Packet boundaries are preserved, however, allowing for transparency to the end user and to the applications generating and receiving the packets. This also allows INPPC schemes to be implemented across intermediary networks with non-compliant devices.

In a first aspect, a method is presented for referencing repeated content to reduce the bandwidth required for transmitting packets in a network. A history of packets that have been previously transmitted is maintained between nodes for a predetermined amount of time. After a first packet is sent between the nodes, a second packet is examined to determine if the second packet matches a previously transmitted packet. If the second packet matches the previously transmitted first packet, a reference identifier is assigned to the second packet and is transmitted to the receiving node. In response to receiving the reference identifier, the receiving node accesses the previously transmitted first packet.

In a second embodiment, one or more computer-storage media with computer-usable instructions embodied thereon perform a method of optimizing the bandwidth utilized in transmitting packets in a network. A first packet is transmitted from a transmitting node to a receiving node in the network. A history of packets transmitted between the nodes is maintained at both nodes. A second packet is analyzed to determine if the second packet matches the first packet. If a match is determined, an identifier is transmitted to the receiving node to access the first packet according to the history, thereby preventing transmission of the second packet. If a match is not determined, the second packet is transmitted.

In a third embodiment, a system for exploiting redundancies in packet transmissions is given. The system comprises a transmitting node with an associated cache memory structure and a receiving node with an associated cache memory structure. The system utilizes a first historical record at the transmitting node containing transmissions of a given time period between the transmitting node and the receiving node and a second historical record identical to the first. Also included is a comparison module at the transmitting node to determine if subsequent packets to be transmitted match previously transmitted packets. For packets that match, a reference identifier is transmitted in lieu of transmitting the entire packet.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for reducing the bandwidth required for transporting packets across a network through the use of an in-network per-packet cache (INPPC) scheme. A network operator may implement the systems and methods described below across segments of a network or between each connection in the network at the operator's discretion. The described embodiments add little overhead to the normal operations of upstream or downstream flows. The paper entitled "Optimizing Wireless Networks by Free-Riding on Users" by Sridhar Machiraju is herein incorporated by reference.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. Further, various technical terms are used throughout this description. An illustrative resource that fleshes out various aspects of these terms can be found in *Newton's Telecom Dictionary* by H. Newton, $22^{nd}$ Edition (2006).

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In certain embodiments, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
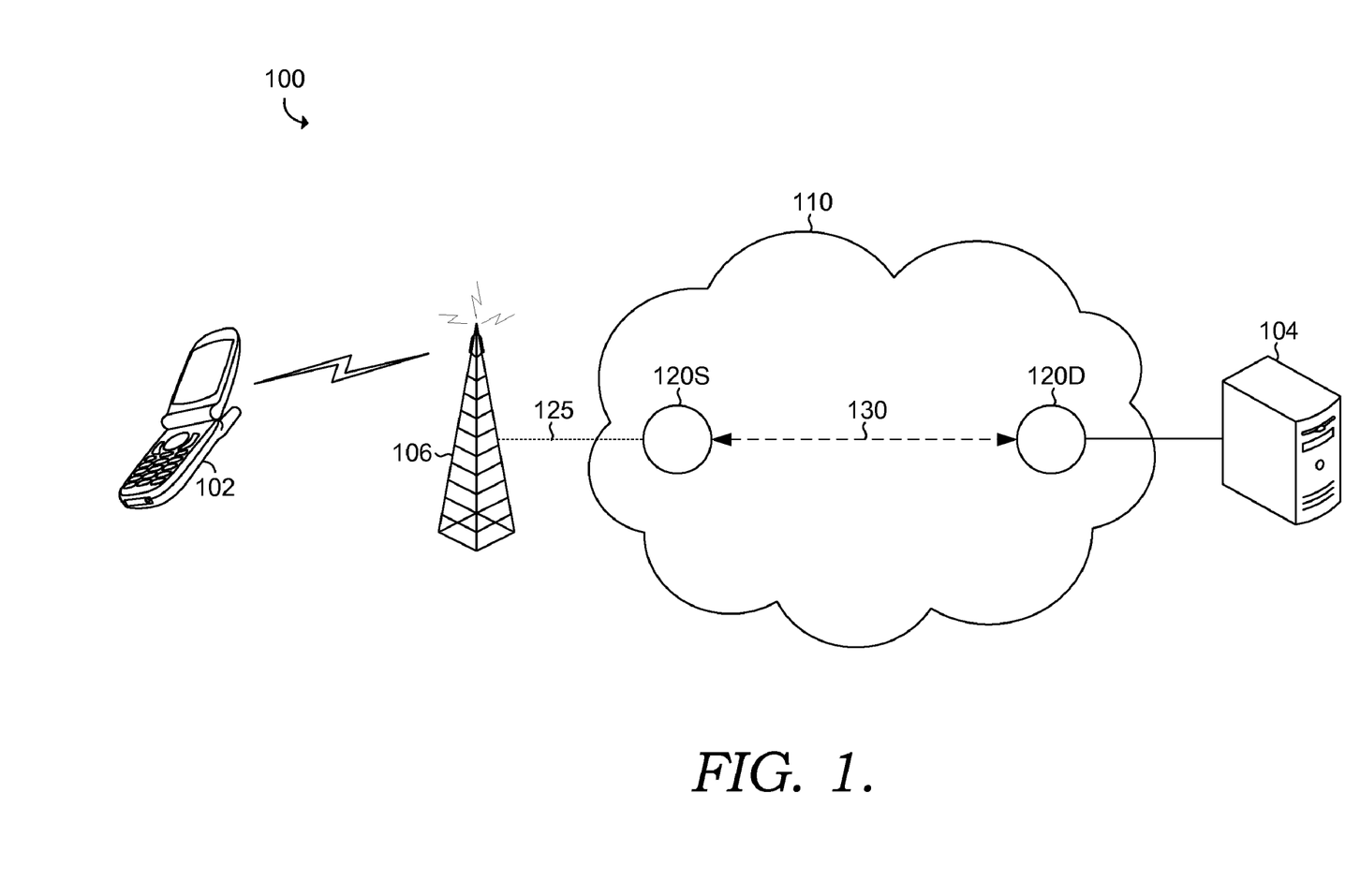
FIG. 1 is a simplified diagram of an exemplary network.

It should be understood in the below descriptions and in the figures that like elements are numbered similarly where possible for the sake of clarity. Turning now to FIG. 1, a simplified version 100 of an exemplary network is depicted that connects two devices. A source device 102 is shown that sends and receives data packets from a base transceiver station (BTS) 102. For the purpose of the figure, source device 102 is shown as a cellular phone, however, this is not intended to limit the types of devices that can send data packets to BTS 106. For example, source device 102 could be a personal data assistant (PDA), or a hybrid device that transmits packets for voice and data. Other exemplary devices given for illustration of source device 102 could be a laptop computer or a personal computer. BTS 106 is depicted as a tower and station for receiving cellular phone communications, but again, this is not intended to limit the scope of the invention. BTS 106 alternatively could be an access-point base transceiver station, which is sometimes referred to as a "femto cell," for use in buildings and areas of difficult cellular reception. However, BTS 106 does not need to receive cellular signals at all. BTS 106 could be a wireless access point for providing wireless internet access, such as a Wi-Fi hotspot. Also by way of example, BTS 106 could be a wireless router for a home or small business location. BTS 106 may be any type of access point available from a wired internet service provider (ISP) or wireless provider. There are a number of other illustrative examples, but all share the ability to provide access to a network by sending and receiving packet data. Limitation of packets to a single protocol should not be construed, but rather any sort of packet containing data is contemplated. Transmitted packets could use Internet Protocol (IP), Transmission Control Protocol (TCP), User Datagram Protocol (UDP), or any other host formats that are currently available or may become available in the future.

The data packets received at BTS 106 are transmitted to a network 110, where it is received by a source node 120S. Source node 120S may alternatively be referred to as an ingress node to denote the entry of data into network 110. Network 110 may be a wireless network or a wired network. The data is transmitted from source node 120S to a destination node 120D across connection 130. Connection 130 is shown as a dotted line to represent the variable nature of the connection. Connection 130 may directly connect source node 120S and destination node 120D by a single, wired connection. However, connection 130 also may have a number of intermediate devices between source node 120S and destination node 120D. Other illustrative examples include a virtual private circuit (VPC) or connected networks acting as a single larger network, as may be employed at a large enterprise or university, for example.

Data received at destination node 120D then is transmitted to a destination device 104. Destination node 120D alternatively may be referred to as an egress node, because data is exiting the network. Destination device 104 is illustratively depicted as a server, but could be any number of computing devices. Examples without limitation include web servers, multi-media servers, application servers, voice application servers, databases, personal computers, laptop computers, cellular phones, PDAs, or hybrid voice-data devices. Destination device 104 is shown as connected via a wired connection, however destination device 104 may also be connected wirelessly in a manner similar to source device 102 or in a different manner altogether. Destination device 104 need not be connected directly to network 110 at all, but may be a device on a different network connected either directly or indirectly to network 110. There may be a number of intermediate networks connecting destination node 120D on network 110 and destination device 104.

As one ordinarily skilled in the art will appreciate, the flow of data between two devices is typically bi-directional. Thus, while source device 102 is shown transmitting data to destination device 104, destination device 104 may also transmit data to source device 102. When the flow of data is reversed, destination node 120D becomes a source or ingress node and source node 120S becomes a destination or egress node. An example is the access of web sites through Hypertext Transfer Protocol (HTTP). Source device 102 sends and receives data from a destination device 104, which can be a web server for example, using HTTP. Different nodes may be employed when data flows from destination device 104 to source device 102. One ordinarily skilled in the art will also recognize that nodes may be both source nodes and destination nodes capable of sending or receiving data. The equipment available at any given node may vary, but will allow for the reception, transmission, or routing of data packets. Exemplary equipment may include routers, hubs, edge servers, media gateways, residential gateways, switches, or any other equipment used for receiving, routing, and/or transmitting packets.

Figure 2:
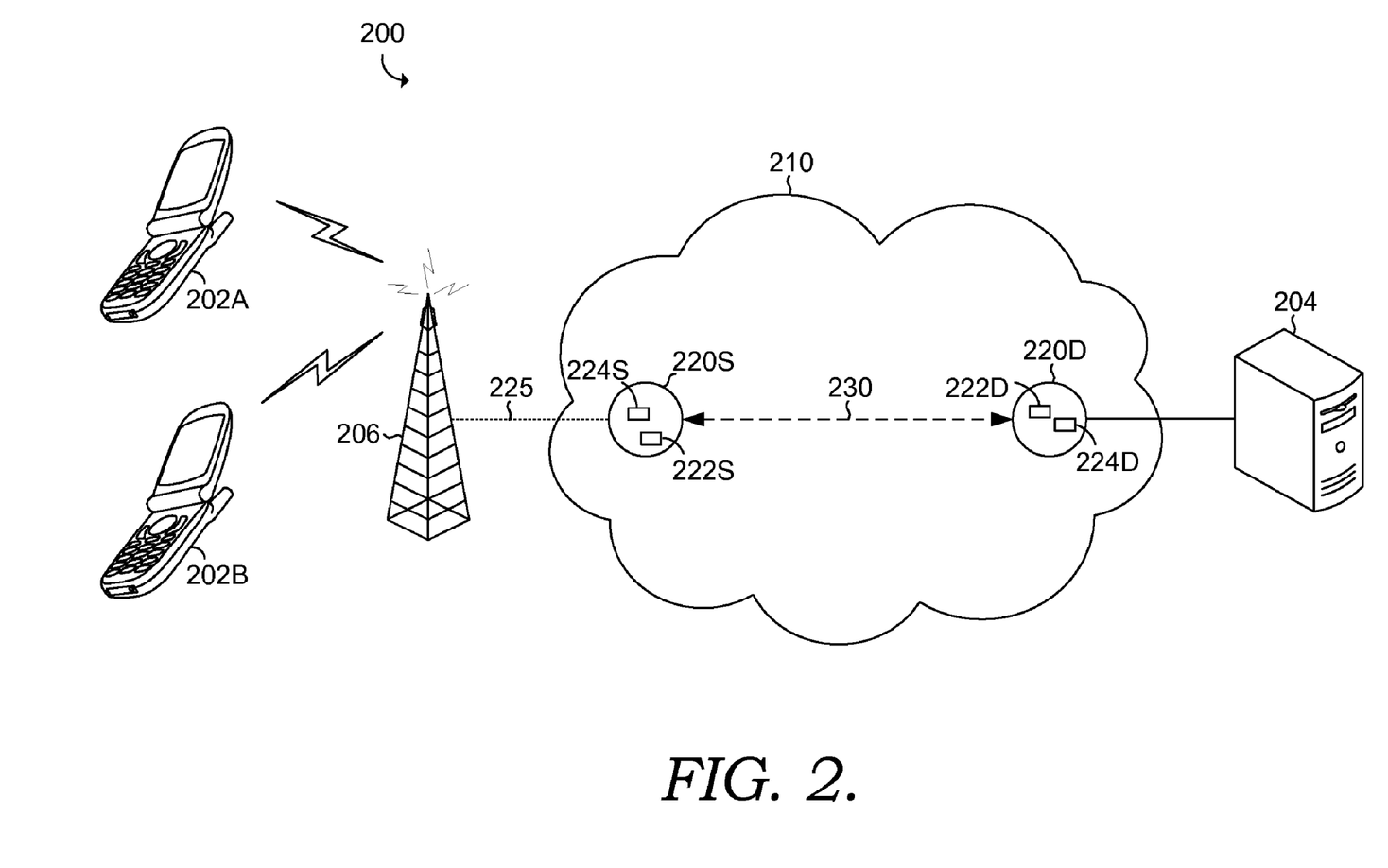
FIG. 2 is a simplified diagram of an exemplary network utilizing an INPPC scheme across a single link according to embodiments of the present invention.

Moving to FIG. 2, an architecture 200 using an INPPC scheme on a single link is shown. A first source device 202A, a second source device 202B, a BTS 206, a network 210, and a destination device 204 are depicted with substantial similarity to the corresponding numbered elements of FIG. 1. FIG. 2 also includes a similar source node 220S and a destination node 220D, although source node 220S further includes a cache memory 222S and a maintained history 224S. Destination node 220D further includes a cache 222D and history 224D. It should be understood that while numbered differently to denote the node with which each history is associated, histories 224S and 224D are identical, as they represent the history or transmissions between the source and destination nodes. Each history can be a relational table, and may be used interchangeably with the term reference table or structure while describing the present embodiments of the present invention. Histories 224D and 224S can be any types of data structures. It is understood that nodes 220S and 220D agree upon a consistent way to assign unique identifiers to packets.

The structure of history 224S contains identifiers to previously transmitted packets. The history is configured to contain the transmitted packets for a configurable amount of time. As an example, history 224S may contain references to packets transmitted in the previous five seconds. This is merely meant to be illustrative in nature, however, and should not be construed as a limitation. Any duration of time is possible as a time period for which packet histories should be maintained, provided enough memory and processing power are available at each end of the transmission to access the histories. After transmission on a connection 230, packets are examined at destination node 220D. If the transmission contains reference identifiers as compared with history 224D, then the original packets are used to replace the reference identifiers. Thus, it is imperative that the two ends of the connection agree on the recent history in use prior to the transmission. In this way, nodes only substitute identifiers for packets when the same identifiers and packets are available at the receiving node for access.

Connection 230 is shown as a dotted line to denote that the connection is direct between the nodes, even though this connection need not be wired or only connect the two nodes depicted. It also should not be construed to be limited to the flow between two users. In fact, it is contemplated that the embodiments of the present invention will be well-suited to uses involving more than one user. Because reference identifiers are used for entire packets throughout, users of source device 202A and source device 202B do not see any differences in the transmission of packets that may be requested by the other user, and therefore sent as reference identifiers across connection 230, as opposed to the packets that device has requested without the use of identifiers. Destination device 204 also does not receive or transmit data packets any differently during the use of the claimed embodiments. Likewise, the applications sending and receiving the packets on each device see no difference. This allows multiple users and application to access the same content without any noticeable difference upon reception.

For example, device 202A and device 202B may both request access to a broadcast of a football game hosted as streaming media content on device 204. Both send requests that are specific to their device and therefore appear different to the network when sent from node 220S to node 220D. However, when the streaming media content is sent from device 204 to node 220S via node 220D, the network sees no difference in the packets transmitted between nodes. Therefore, rather than use twice the bandwidth required to transmit the packets twice, only reference identifiers are sent from node 220D to 200S in response to the "duplicate" request. At node 220S, history 224S can be consulted to access the packets contained at cache 222S in order to send the media content to device 202B.

The transmission need not involve two devices. As another example, if device 202A requests packets that are subsequently retransmitted, the packets may be recalled from cache 222S. Once again, rather than use available bandwidth for packets that have been recently transmitted, the identifiers associated with the first transmission are sent. All that is needed is a maintained history that is tightly synchronized between the nodes. Packets lost during a first transmission will not have a corresponding reference packet on the other end, and will require discarding a reference identifier on the receiving end. However, the bandwidth optimization due to INPPC will likely ensure that no more packets will be lost than would be the case without the INPPC scheme.

Figure 3:
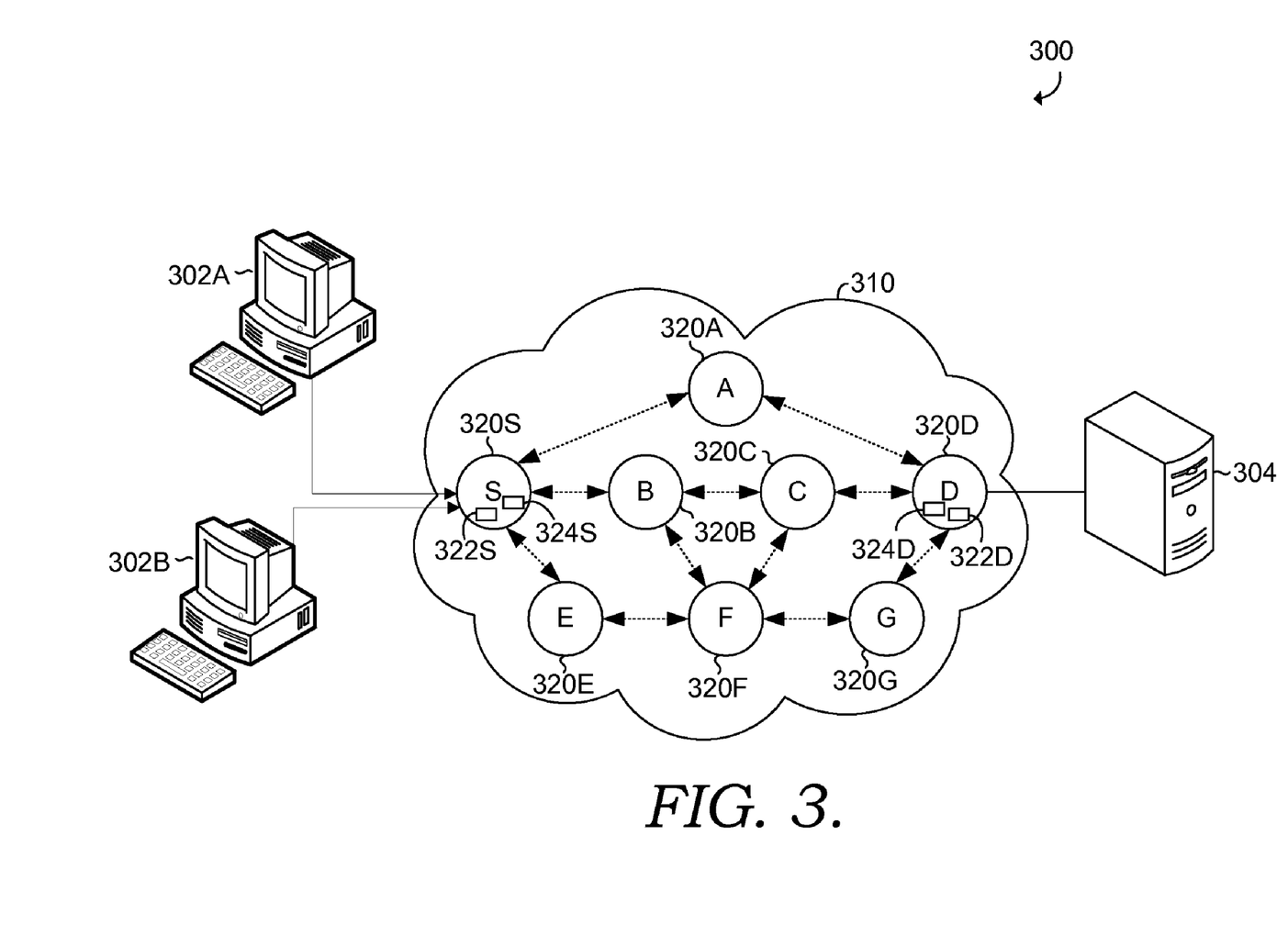
FIG. 3 is a simplified diagram of an exemplary network utilizing an INPPC scheme across multiple links according to embodiments of the present invention.

An architecture 300 using an INPPC scheme involving a larger number of nodes, that is a multiple-link topology, is depicted in FIG. 3. A personal computer 302A is shown as a first source device. A personal computer 302B is shown as a second source device. A server 304 is depicted as a destination device. A network 310 is depicted that contains a source node 320S and a destination node 320D. Source node 320S also includes a cache 322S and history 324S, while destination node D includes a cache 322D and history 324D. However, network 310 is shown to have nodes 320A, 320B, 320C, 320E, 320F, and 320G as well. Corresponding cache and history structures are not depicted for the sake of clarity, however it should be noted that all of the additional nodes in the network could utilize such features.

As a result of the increased complexity and added elements, a single connection from source node 320S to destination node 320D does not exist in network 320. Rather, a series of connections or links can be made between the plurality of nodes in order to transmit a packet from source node 320S to destination node 320D. For this reason, the connections shown in FIG. 3 use dotted lines and are not numbered. Using initials to denote their respective nodes, packets can be routed through SAD, SBCD, or SEFGD in order to travel from source node 320S to destination node 320D. FIG. 3 also depicts nodes B, C, and F as interconnected elements, so SBFCD, SBFGD, SEFCD, and SBCFGD are plausible routes over which packets could be sent from source node 320S to destination node 320D. It should be understood that in instances other than the present exemplary case, any node could be a possible destination or a possible source, with packets transmitted between any of the remaining plurality of connected nodes. The number of nodes, interconnections, and plausible routes are intended to be illustrative in nature without limiting the scope of the present invention. A network could have thousands of nodes and millions of routes, if not more, while still falling within the intended scope of the present invention.

Using an INPPC scheme covering multiple links, coordination of structures 320S, 320D, 320A-C, and 320E-G becomes more complex, but allows for greater flexibility. One exemplary case would be that of a university network setting. A source node could represent the connection into a single computer lab or dormitory. Multiple students requiring access of a course's content, such as a recorded lecture, could each stream only one packet to the required node. Subsequent attempts to stream the same content would require less bandwidth by sending the reference identifiers to the node 320S. Provided that synchronization of history 324D and 324S is maintained, the reference identifiers would allow any number of users to access those packets without using the corresponding multiples of the original bandwidth (i.e., "n" users of a file requiring "b" bandwidth would not require (n·b) bandwidth to receive the content, but some fraction thereof). In another example, to stream a lecture to 25 students on five different nodes, only five times the original bandwidth will be needed to actually transmit packets. The additional 20 students, provided they are at one of the five nodes that has already received the packets, can access the packets through receiving the identifiers and accessing the cached packets at that node. The route of the packets is of no consequence, as long as the history of packets between the nodes is rigorously maintained. Thus, nodes A, B, C, D, and E could all receive packets from node S provided that five respective histories are maintained.

Figure 4:
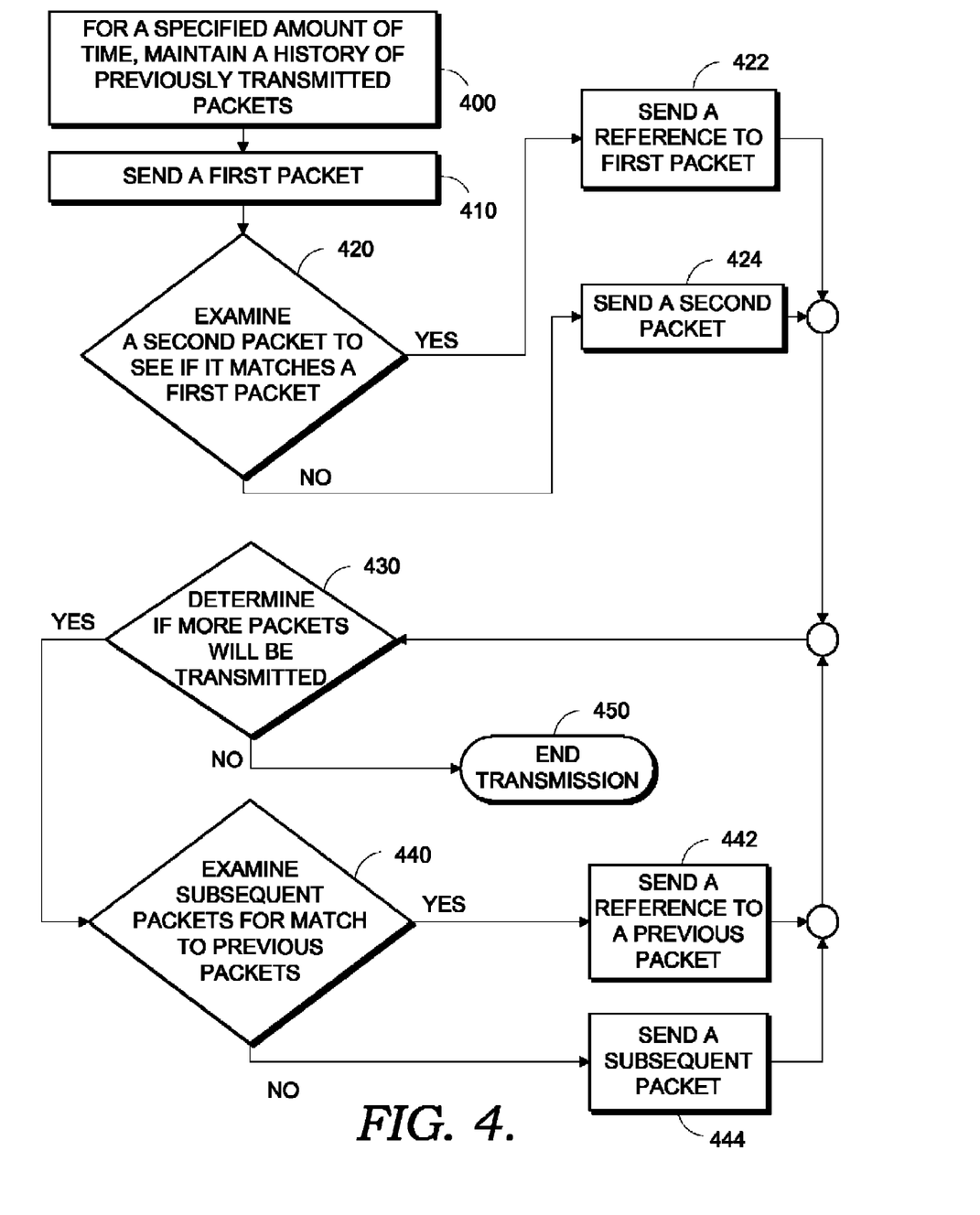
FIG. 4 is a flow chart of an INPPC scheme according to embodiments of the present invention.

Turning to FIG. 4, a flow chart of an exemplary INPPC scheme is shown. It should be noted that other methods could be employed without departing from the scope of the invention. At a step 400, an amount of time is specified for which a history of previously transmitted packets between a source and a destination is maintained. Alternatively, the number of packets whose history is maintained can be specified. A first packet is sent at a step 410. At a step 420, a second packet is examined to see if it has previously been sent, within the specified time constraint, as the first packet. If the second packet matches the first packet maintained in the history, at a step 422 a reference to the first packet is sent. If the there is not a match, the second packet is sent at a step a step 424.

A packet will be understood to have a header portion and payload portion. The header provides information about the packet such as source, destination, file type, encryption and other pertinent information. The payload is the actual data carried by the packet, such as text, audio, video, or graphics data. Neither of these lists are intended to be exhaustive, but merely exemplary. In the examples seen above, the destination of packets may vary by whether it is intended for device 200A or device 200B, but the content in the payload may be exactly the same. In such a case, "matching packets" is construed as packets with only identical payload contents. To exploit redundancies due to packet retransmissions, however, "matching packets" can be construed as packets having identical payloads and header content. There are methods for examining packets to determine whether or not the payloads, the headers, or a combination of both match. For example, signatures can be used at each node to determine whether or not identical payloads are being sent. The use of a particular signature is not required. In one instance, a signature such as a hash can be used to determine whether a matching packet or original packet is being transmitted. Certain rules for analysis of matching packets can be established as well. For example, re-transmission of TCP packets can be determined as previously transmitted packets and their respective identifiers automatically sent. Likewise, if a continuous stream of packets is determined to be sent to two different users, then the reference identifiers to the first stream can automatically be sent for the second stream for the duration of the duplicitous streams. This can save unneeded examination of packets that are assumed to be referenced by another transmission.

Returning to FIG. 4, the method continues at a step 430 with a determination of whether or not more packets will be sent. If there are no more packets to send, the transmission ends at a step 450. If there are more packets, the subsequent packets are examined for a match to previous packets at a step 440. At a step 442, a reference is sent if the packet to be transmitted matches a previously transmitted packet within the history. If there is no match in the history, the subsequent packet is sent at a step 444. In either event, the method continues to determine whether or nor more packets are to be transmitted as seen previously at step 430 until the end of the transmission is reached at step 450.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for referencing repeated content to reduce the bandwidth required for transmitting packets in a network, the method comprising:

maintaining a history of packets that have been previously transmitted from a sending node to a receiving node, wherein the history is maintained according to at least one of a period of time and a total number of packets;

examining a second packet to determine if the second packet matches a previously transmitted first packet sent between the nodes within the predetermined amount of time;

determining that the second packet is one of a first plurality of packets included in a retransmission of the first plurality of packets;

utilizing the history of packets that have been previously transmitted, assigning a reference identifier to the second packet when the second packet matches the previously transmitted first packet;

automatically transmitting the reference identifier for the second packet and a reference identifier for each of the other packets in the first plurality of packets to the receiving node; and accessing the previously transmitted first packet and a second plurality of previously transmitted packets corresponding to each of the other packets in the first plurality of packets in response to receiving the assigned reference identifier.

2. The method of claim 1, further comprising repeating the examining, assigning, transmitting, and accessing for subsequent packets.

3. The method of claim 2, wherein the reference identifiers are assigned utilizing a first cache memory.

4. The method of claim 3, wherein the reference identifiers are utilized to access a second cache memory at the receiving node.

5. The method claim 2, wherein the second packet matches the previously transmitted first packet if a payload portion of the first packet matches a payload portion of the second packet.

6. The method of claim 5, wherein a hash is used to determine if the payload portions match.

7. The method of claim 2, wherein the second packet is a retransmission of the first packet.

8. The method claim 2, wherein the transmitting node and the receiving node are logically connected by one or more intermediate nodes.

9. One or more computer-storage media with computer-usable instructions embodied thereon to perform a method of optimizing the bandwidth utilized in transmitting packets in a network, the method comprising:

transmitting a first stream comprising a first plurality of packets from a transmitting node in the network to a receiving node in the network;

maintaining a history of packets transmitted between the transmitting node and the receiving node, wherein the history is maintained at both nodes;

analyzing a second packet to determine if the second packet matches a packet in the first stream of packets;

determining that the second packet is one packet in a second stream of packets that matches the first stream of packets;

automatically transmitting an identifier to the receiving node for each of the packets in the second stream of packets to access the first stream of packets according to the history at the receiving node, thereby preventing transmission of the second stream of packets.

10. The media of claim 9, the method further comprising:

analyzing subsequent packets to determine if the subsequent packets match transmitted packets maintained in the history of transmitted packets; and if a match is determined, transmitting an identifier to the receiving node to access the matching packet according to the history at the receiving node, thereby preventing transmission of the subsequent packet; and if a match is not determined, transmitting the subsequent packet.

11. The media of claim 10, wherein maintaining a history is configurable according to at least one of: a time period and a total number of packets.

12. The media of claim 11, wherein each packet is assigned an identifier in a first cache memory structure at the transmitting node that corresponds to an identifier in a second cache memory structure at the receiving node.

13. The media of claim 12, wherein each packet includes a payload portion and a header portion, and wherein analyzing determines if one of a payload portion, a header portion, and a payload-header combination of a packet matches a respective payload portion, a header portion, and a payload-header combination of a previously transmitted packet.

14. The media of claim 12, wherein analyzing includes utilizing a signature.

15. The media of claim 14, wherein the signature is a hash.

16. The media of claim 12, wherein a retransmission automatically is analyzed to be a subsequent packet that matches a previously transmitted packet maintained in the history of transmitted packets.

17. A system for exploiting redundancies in packet transmissions, the system comprising:
- a transmitting node with an associated cache memory structure;
- a receiving node with an associated cache memory structure; a first historical record at the transmitting node containing references to packets transmitted between the transmitting node and the receiving node;
- a second historical record at the receiving node identical to the first historical record; and
- a comparison module at the transmitting node to determine if subsequent packets to be transmitted match previously transmitted packets,
- wherein when the comparison module determines that the subsequent packets match the previously transmitted packets and the subsequent packets and the previously transmitted packets are part of a stream of packets, the transmitting node automatically transmits the references to the previously transmitted packets that comprise the stream and prevents transmission of the subsequent packets, and
- wherein when the comparison module determines that the subsequent packets match the previously transmitted packet and the subsequent packets comprise a retransmission of the previously transmitted packets the transmitting node automatically transmits the references to the previously transmitted packets.

18. The system of claim 17, wherein the comparison module examines packet payload information of subsequent packets to determine if the packets match previously transmitted packets.

19. The system of claim 17, wherein the given time period for the first Historical record is configurable.

* * * * *

UNITED STATES PATENT AND TRADEMARK OFFICE
CERTIFICATE OF CORRECTION

PATENT NO. : 7,787,368 B1  
APPLICATION NO. : 12/038842  
DATED : August 31, 2010  
INVENTOR(S) : Sridhar Machiraju It is certified that error appears in the above-identified patent and that said Letters Patent is hereby corrected as shown below:

On the Title Page, Title of Invention Item (54), "CASHES" should read --CACHES--

Column 1, Line 1, "CASHES" should read --CACHES--

Signed and Sealed this
Twenty-fifth Day of January, 2011

David J. Kappos
*Director of the United States Patent and Trademark Office*